United States

Kaye et al.

[11] 4,012,359

[5] Mar. 15, 1977

[54] ANTIBACTERIAL AGENTS FOR GRAM-NEGATIVE BACTERIA

[75] Inventors: Saul Kaye, Evanston, Ill.; Robert L. Iverson, Northfield, Ohio

[73] Assignee: Ferro Corporation, Cleveland, Ohio

[22] Filed: June 13, 1974

[21] Appl. No.: 478,899

Related U.S. Application Data

[63] Continuation-in-part of Ser. No. 313,404, Dec. 8, 1972, abandoned.

[52] U.S. Cl. .................... 260/45.8 NE; 106/15 R; 260/23 XA; 260/29.6 MN; 260/29.7 N; 260/31.8 R; 424/78; 424/83; 424/273

[51] Int. Cl.² .................................................. C08K 5/34

[58] Field of Search .............. 260/45.8 NB, 45.8 N; 106/15 AF; 424/83, 78

[56] References Cited

UNITED STATES PATENTS

| | | | |
|---|---|---|---|
| 2,553,770 | 5/1951 | Kittleson | 260/326 |
| 2,553,775 | 5/1951 | Hawley et al. | 260/309.5 |
| 2,798,022 | 7/1957 | Yowell et al. | 424/83 |
| 2,919,200 | 12/1959 | Dubin et al. | 424/83 |
| 3,005,720 | 10/1961 | Teller | 106/15 |
| 3,081,221 | 3/1963 | Moyle et al. | 106/15 |
| 3,096,183 | 7/1963 | Genth | 106/15 |
| 3,105,060 | 9/1963 | Schramm et al. | 260/45.75 |
| 3,178,447 | 4/1965 | Kohn | 260/309.5 |
| 3,199,990 | 8/1965 | Taylor | 106/15 |
| 3,271,245 | 9/1966 | Cremlyn et al. | 424/273 |
| 3,371,063 | 2/1968 | Girard | 260/45.8 |
| 3,705,235 | 12/1972 | McIntosh et al. | 424/83 |
| 3,911,135 | 10/1975 | Tirpak et al. | 424/274 |
| 3,919,410 | 11/1975 | McIntosh et al. | 424/78 |

*Primary Examiner*—Melvyn I. Marquis
*Assistant Examiner*—R. A. White
*Attorney, Agent, or Firm*—Milton L. Simmons; Wesley B. Taylor

[57] ABSTRACT

A limited class of compounds is disclosed for use in low dosage to inhibit the growth of or to kill fungi, Gram-positive, and especially Gram-negative bacteria. These compounds are members of a family in which the trichloromethylthio group is appended to a nitrogen atom forming part of a ring structure. While a number of the compounds of this general family have some effect against other microorganisms, such as *Staphylococcus Aureus*, *Aspergillus Niger*, *Streptoverticillium Reticuli*, only a few of the compounds in this general family have been found to have an effect against Gram-negative bacteria as well. This unique property makes the present compounds especially useful as bacteriostatic and bactericidal agents to be incorporated in resinous materials, such as polymeric resinous materials, whether contained in bulk, film, or liquid solution or dispersion.

9 Claims, No Drawings

ANTIBACTERIAL AGENTS FOR GRAM-NEGATIVE BACTERIA

CROSS-REFERENCE TO RELATED APPLICATION

This is a continuation-in-part of an application, Ser. No. 313,404, filed Dec. 8, 1972, now abandoned.

BACKGROUND OF THE INVENTION

Many different resinous materials are subject to invasion by a wide variety of microorganisms in that the microorganisms are free to multiply with little or no inhibition while in contact with the resinous material. These organisms, such as fungi and bacteria, damage the resinous materials both by metabolizing any plasticizer and lubricant that may be present in the materials, thereby rendering them stiff, and also by esthetically discoloring and defacing the resinous materials themselves. To prevent the proliferation of all types of microorganisms on such materials, chemical compounds are often added. It is desirable that these additives be effective at concentrations sufficiently low to have no deleterious effects on the resinous material, and at the same time be effective against as wide a spectrum of microorganisms as possible.

The nature of the resinous material does not matter. Many resins in bulk, film or other form are by themselves normally defenseless against bacterial growth on their surfaces. Such resinous materials include, for example, the polyvinyl resins such as polyvinyl chloride, polyvinyl alcohol, polyvinyl acetate, the various acrylic resins and methacrylic resins, such as polymethacrylate; polyolefins such as polyethylene, polypropylene, and polyisobutylene; polyurethanes; elastomers such as styrene-butadiene copolymers; butadiene-acrylonitrile copolymers; celluloses such as methyl cellulose, ethyl cellulose; and still others.

Further, it is not necessary for a resinous material to be in solid form to be subject to attack by fungi and bacteria. Liquid paint, for instance, is so subject and water-based paints such as the known water-based latex paints are especially subject to attack by Gram-negative bacteria. Even though such paints are fairly sealed in containers, Gram-negative bacteria can reach and cause the paint to spoil and become smelly and stringy in composition. When this happens, the paint cannot be applied to a substrate.

Among the bacteria which propagate on organic resinous material, for example of the type mentioned, are Gram-negative bacteria *Escherichia coli* and *Pseudomonas aeruginosa*. *Escherichia coli* is a common contaminant of water and sewage. It is a ubiquitous organism, found especially frequently and in high concentration in the digestive track of humans. It is commonly used as an index of pollution, for where it is located in large numbers it indicates pollution by human excrement. This organism is more resistant to disinfection than are many others, particularly when the disinfectant or chemical inhibitor is to be incorporated into a solid matrix, such as is the case with resinous materials. A bactericide with the ability to inactivate or destroy a Gram-negative bacterium like *Escherichia coli* has considerable technical and commercial advantage. It is also highly desirable that the bactericide be effective in relatively low quantities in order to avoid discoloration of material to which it is added such as resins.

*Pseudomonas aeruginosa*, another Gram-negative bacteria, is a health threat since it tends to spread infection and, in fact, is found in pus from body wounds. It is also found in polluted water and sewage and is a cause of human and animal lesions. Consequently, the ability to inactivate or destroy this organism is also important.

In addition, it must be borne in mind that the fact that certain compounds are effective against fungi would not for that reason suggest to one skilled in the art that the same compounds were also effective against bacteria. Likewise, the fact that certain compounds are effective against one classification of bacteria, such as Gram-positive bacteria, would not for that reason suggest to one skilled in the art that the same compounds would be effective against another classification of bacteria, such as Gram-negative bacteria.

SUMMARY OF THE INVENTION

It has now been discovered that a very few compounds in the class of N-trichloromethylthiomides are effective not only against fungi, streptomyces, and "Gram-positive" bacteria, such as *Staphylococcus*, but also against Gram-negative bacterial such as *Escherichia coli* and *Pseudomonas aeruginosa*.

Compounds of this highly selective class of the present invention have the formula:

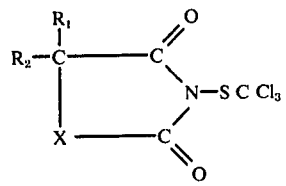

in which both $R_1$ and $R_2$ are hydrogen, methyl, or ethyl and may be the same or different, and X is a divalent radical of the class $=CR_1R_2$ or $=NH$. Compounds of the present invention are antibacterial agents and may be used like other bacteriostats and bactericides. For instance, the compounds may be directly incorporated into a resinous material before it is fabricated, molded, or otherwise shaped into a desired form. When used in this manner, the present compounds are effective against Gram-negative bacteria in as little amount as about 0.1 part by weight of compound per 100 parts by weight of a resinous material, for example, polyvinyl chloride. Use of such small amounts does not impart undesirable properties to the resinous material. Greater amounts, such as 1.5 percent by weight of the present compounds in a resinous matrix and even more are acceptable, although use of more than about one percent is usually wasteful.

Alternatively, a present compound may be dispersed or dissolved in a liquid carrier inert with respect to the compounds, such as benzene, and then sprayed, coated, or otherwise applied to a surface or point of use where Gram-negative responsive bacteria are expected. Or when the resinous material is contained in a liquid solvent or dispersant, such as paint, a compound of the present invention may be directly added to the paint and within the same weight ratio of compound to resinous material previously given.

DESCRIPTION OF THE PREFERRED EMBODIMENTS

N-trichloromethylthio compounds are known as a general class. Compounds of this broad genus are disclosed, for example, by U.S. Pat. Nos. 2,553,770 to 2,553,778, inclusive. However, such compounds are not known to be effective against Gram-negative bacteria like *Pseudomonas aeruginosa* or *Escherichia coli* and are not, in fact, effective except for the restricted, limited class herein defined according to Formula I, as hereinafter more fully described.

The manner of preparing the present compounds is known. Reference is made, for example, to the cited U.S. Pat. Nos. 2,553,770 through 2,553,778. The N-trichloromethylthio compounds of the invention may be prepared in general by the reaction of perchloromethyl mercaptan (ClSCCl$_3$) with the corresponding imide of the metal salt of the compound sought, for example, the sodium, potassium or lithium salt. When the imide salt is used as the starting material, it is first dispersed in an organic liquid, such as benzene or dioxane, and while stirring and heating to about 50° to about 80° C., an approximately equal molecular quantity of perchloromethyl mercaptan is added over a period of about 1 to 2 hours. The reaction is continued for about 3 to 4 hours after all the mercaptan has been added. After cooling, the reaction mixture is filtered to remove the metal halide and any unreacted imide salt. The N-trichloromethylthioimide is recovered by concentrating the solvent filtrate and recrystallizing the residue from a suitable solvent.

U.S. Pat. No. 2,533,771 describes an alternate method of preparing the compounds comprising dissolving the selected imide without first forming the metal salt in aqueous alkaline solution, followed by an addition of an equal molecular quantity of perchloromethyl mercaptan. The mixture is stirred rapidly until the aqueous medium becomes acid to litmus and then is filtered and air dried.

As indicated, the compounds found to be effective against Gram-negative bacteria of the class *Escherichia coli* and *Pseudomonas aeruginosa* are narrowly restricted to those of the general formula:

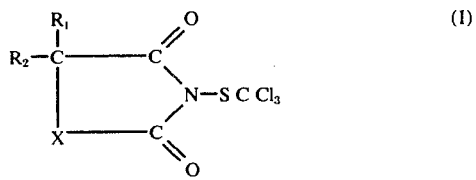

in which both R$_1$ and R$_2$ are hydrogen, methyl, or ethyl and may be the same or different, and X is a divalent radical of the class =CR$_1$R$_2$ or =NH, R$_1$ and R$_2$ having the same meaning as initially given. Specific, preferred embodiments are N-trichloromethylthio-5,5-dimethyl hydantoin and N-trichloromethylthio succinimide.

The following examples are intended only to illustrate the invention and should not be construed as imposing limitations on the claims.

EXAMPLES 1 THROUGH 18

Eighteen related compounds, including 16 having the N-trichloromethylthio moiety, were synthesized. These compounds are listed in the accompanying Table A. Each compound was incorporated into a polyvinyl chloride resinous material in accordance with the following formula:

| Ingredient | Parts by Weight |
|---|---|
| Polyvinyl chloride resin | 100.0 |
| Primary plasticizer-dioctyl phthalate | 40.0 |
| Secondary plasticizer-epoxidized soybean oil | 5.0 |
| Titania pigment | 3.0 |
| Heat stabilizer | 0.5 – 2.5 |
| Stearic acid lubricant | 0.5 |
| N-trichloromethylthio compound under test | 0.5 |

The heat stabilizer may be any of those known in the art, the amount used depending on the stabilizer chosen and degree of the stabilizations sought. For example, when the heat stabilizer is dibutyl tin-bis (isooctyl thioglycolate), about 0.5 part by weight is used. Other heat stabilizers that may be used include the organotin compounds, such as are disclosed in U.S. Pat. Nos. 2,641,588 and 2,713,585. For the purpose of providing a common basis of comparison, polyvinyl chloride was used as the resinous material in all of the examples. However, any of the commonly known resins, such as those previously mentioned, could have been used instead.

The ingredients were mechanically admixed by being milled together for 10 minutes on calender rolls heated at 320° F and then heated out as films of uniform thickness. A disc of each film, three-fourths inch in diameter, was then placed on each of four different test plates containing a nutrient agar appropriate for multiplication of the test organisms. The four plates of each film under test were then each respectively inoculated with *Staphylococcus aureus*, *Escherichia coli*, *Aspergillus niger*, or *Streptoverticillium reticuli*. The plates containing the first two organisms were incubated at 37° C for 2 days; After the incubation, the growth on the plates was examined. Inhibitory effect was evident if there existed a clear zone surrounding the test disc, in which a microorganism was unable to reproduce. Lack of inhibition was signified by cloudy nutrient agar or by visible growth of organism.

The following Table A lists the results of these tests. For each organism listed, a "Yes" designation indicates that the corresponding compound was effective in inhibiting microbiological proliferation near or on the disc; a "No" designation indicates no inhibition by the compound under test. A large proportion of the N-trichloromethylthio compounds under test, 12 out of 18, had no effect whatsoever on any of the four types of organisms at the concentration tested. Only six of the 18 had any effect on at least two of the four types of organisms. However, only those compounds of the present invention, Examples 8 and 9, and those alone had any effect on the Gram-negative organism, *Escherichia coli*. Accordingly, there is some remarkable property of Examples 8 and 9 of Table A which renders them effective against this Gram-negative organism, while none of the remaining compounds shows any effect against it.

The two preferred embodiments of the invention, N-trichloromethylthio 5,5 dimethyl hydantoin and N-trichloromethylthio succinimide, are substantially equally effective insofar as is presently known.

It is emphasized that the foregoing data illustrate that the present compounds are effective in polyvinyl chloride resins in as little as 0.5 part per 100 parts of resin. At this relatively low dosage, there is no discoloration of the resin. Greater amounts can be used up to at least 1.5 parts per 100 parts of resin. As the concentration of the compound is raised, there occurs increasing likelihood of discoloration when a resin composition is heated. Normally, it is the plasticizer in a polyvinyl resin which renders it susceptible to mold and mildew. Substantial quantities of a plasticizer, for example 20% or more by weight of the resin, are often used to make the resin product such as a sheet or film suitably flexible.

exerting a bacteriostatic effect is sufficient; however, in cases where one is trying to prevent the spread of human or animal infection, it is desirable to inactivate (or kill) the microorganism.

A standard test has been developed to measure the extent to which a solid surface containing a compound under test is capable of inactivating a microorganism placed upon it. This test is New York State Specification 923, Group 22703, dated Feb. 20, 1969, entitled "Mattress Covering Material". The procedure provides

TABLE A

Effectiveness of Trichloromethylthio Compounds Against Microorganisms
(Concentration: 0.5 part of compound per 100 parts of polyvinyl chloride)

| Example | Compound | Staphyloccocus aureus (Gram-positive) | Escherichia coli (Gram-negative) | Aspergillus niger | Streptoverticillium reticuli |
|---|---|---|---|---|---|
| 1 | N-trichloromethylthio tetrahydrophthalimide | Yes | No | Yes | Yes |
| 2 | N-trichloromethylthio phthalimide | Yes | No | Yes | No |
| 3 | N-trichloromethylthio endomethylene tetrahydrophthalimide | No | No | No | No |
| 4 | N-trichloromethylthio-3,4,5,6 tetrachlorophthalimide | No | No | No | No |
| 5 | N-trichloromethylthio glutarimide | No | No | No | No |
| 6 | N-trichloromethylthio 3,3 dimethyl glutarimide | No | No | No | No |
| 7 | N-trichloromethylthio-N-phenyl benzene sulfonamide | No | No | No | No |
| 8 | N-trichloromethylthio-5,5-dimethyl hydantoin | Yes | Yes | Yes | Yes |
| 9 | N-trichloromethylthio succinimide | Yes | Yes | Yes | Yes |
| 10 | N-trichloromethylthio-1-alkyl-6-aminouracil | No | No | No | No |
| 11 | Di N,N'-trichloromethylthio parabanic acid | No | No | No | No |
| 12 | N-trichloromethylthio N,N' dimethyl dithiooxamide | No | No | No | No |
| 13 | N-trichloromethylthio saccharine | No | No | No | No |
| 14 | N-trichloromethylthio morpholine | No | No | No | No |
| 15 | N-trichloromethylthio 2,4 thiazolidone | Yes | No | Yes | Yes |
| 16 | N-trichloromethylthio maleimide | No | No | No | No |
| 17 | Ethyl trichloromethyl dithioglucollate | Yes | No | No | Yes |
| 18 | Alpha trichloromethyl dithiopropionic acid | No | No | No | No |

The present compounds can also be dispersed or dissolved in non-active carriers, both liquid and powder, and distributed on or about a point of use in that manner. Likewise, the bacteriostats of this invention may be admixed with carriers which in themselves are active or useful for other purposes, as long as there is not interreaction. Such active carriers include other parasiticides, herbicides, fertilizers, wetting agents, paints, lacquers and the like.

EXAMPLES 19 THROUGH 22

The previous examples described tests and results in which certain biologically active compounds added to films of polyvinyl chloride were able to prevent the multiplication of bacteria near or on the film. By the nature of these tests, it is not possible to determine whether the effect on the microorganism is -static or -cidal, that is, whether in the presence of a compound contained in the substrate, the organism simply did not multiply but remained alive and in a state in which it is capable of reproducing when the chemical is removed from the environment; or whether the compound has truly inactivated the microorganism. When the object is to protect a piece of plastic or fabric from damage, the details by which bacteria are to be placed upon test surfaces, and the test surfaces cultured at various time intervals to determine whether the bacteria have multiplied, stayed constant in number, or have been killed by the contact.

Three flexible films of polyvinyl chloride (PVC) were prepared according to the procedure of Examples 1 through 18, and a N-trichloromethylthio compound was incorporated into each resinous film at the concentration of 0.5 part of compound per hundred parts of resin (phr). The compounds identified in Table B by the following number were:

1. N-trichloromethylthio tetrahydrophthalimide
2. N-trichloromethylthio 5,5 dimethyl hydantoin
3. N-trichloromethylthio succinimide The three polyvinyl chloride films, as well as a control film containing no biologically active chemical, were contaminated with cultures of three different microorganisms identified by the following abbreviations:

S.a. = Staphylococcus aureus, a Gram-positive bacterium,

E.c. = Escherichia coli, a Gram-negative bacterium, and

P.a. = Pseudomonas aeruginosa, a Gram-negative bacterium.

The film samples were cultured 4 hours and 24 hours after the bacteria were added, and counts were made to determine the number of living bacteria remaining after these times. The initial contamination was in the neighbourhood of 100,000 living bacteria per sample.

TABLE B

| | | Number of Viable Bacteria Recovered from PVC Films Containing Additives | | | | | |
|---|---|---|---|---|---|---|---|
| | | After 4 Hours Exposure | | | After 24 Hours Exposure | | |
| Compound | Amount | S.a. | P.a. | E.c. | S.a. | P.a. | E.c. |
| None | — | 32,000 | 18,000 | 280,000 | >100,000 | 45,000 | >1,000,000 |
| 1 | 0.5 phr | 280 | 5,300 | 2,700 | 0 | >100,000 | 210,000 |
| 2 | 0.5 phr | 560 | 3 | 170 | 0 | 0 | 0 |
| 3 | 0.5 phr | 0 | 0 | 40 | 0 | 0 | 0 |

> = More than this number of bacteria, exact number not determinable.

It is evident that while N-trichloromethylthio tetrahydrophthalimide caused some immediate reduction in the number of viable bacterial cells of all kinds, after 24 hours of contact, this compound was completely effective against only the Staphylococcus, the Gram-positive organism, and was without effect on the Gram-negative bacteria. The other two compounds, which are of the present invention, are effective against all three types of bacteria.

EXAMPLES 23 THROUGH 26

A conventional, standard, interior latex enamel paint, free of the usual antibacterial agents, was used in these examples. It contained particles of a copolymer of styrene-butadiene as the latex component.

Each of three different samples of the latex paint was treated with a different compound of those listed in Table B. Each compound as placed in jars on a ball mill at concentrations of 1.0% with weighed portions of a paint, and the compounds were milled into the paint for 12 hours to effect complete dispersion. Samples of filter paper were thereafter painted with the three treated paint samples and with an untreated one. All painted papers were allowed to dry 48 hours. They were thereafter tested in accordance with the New York State Specification 923 Test for Mattress Covering Material, using Pseudomonas aeruginosa as test organism, in the manner described previously. The results are shown in Table C. The compound number is the same as that given for Examples 19 through 22.

TABLE C

| Paint Additive | Surviving Number of Pseudomonas aeruginosa After 4 Hours |
|---|---|
| None | 520,000 |
| 1 – 1.0% by weight | 14,000 |
| 2 – 1.0% by weight | 0 |
| 3 – 1.0% by weight | 0 |

Again, the two compounds of the present invention showed significantly greater microbicidal activity against Gram-negative organisms than did Compound 1 which is outside the scope of the invention.

EXAMPLE 27

Polypropylene resin (purchased under the Trademark "Profax") was milled on a two-roll mill at 370° F. for 5 minutes with samples of compound additives 1, 2, and 3 (as previously defined), all in the amounts of 1.5 parts of compound per 100 parts of resin. Films were produced. Discs were punched from these films and placed upon nutrient agar which had been seeded with either Staphylococcus aureus or Escherichia coli. The nutrient agar and discs were then incubated at 37° C. for 2 days. At this time the bacteria had multiplied until they produced visible cloudiness in the agar. Wherever the additive to the polypropylene had any antibacterial activity, a clear zone of inhibition was visible in the agar around the margin of the disc.

All three compounds were found to produce clear zones of inhibition against Staphylococcus aureus. Only compounds designated 2 and 3, however, exhibited any inhibitory activity against the Gram-negative organism, Escherichia coli.

In addition to the foregoing uses, the present compounds may also be used in waxes, such as floor waxes, furniture polishes, lubricants, and the like.

While the foregoing describes several preferred embodiments of the present invention, it is understood that the invention can be practiced in still other forms within the scope of the following claims.

We claim:

1. In combination: a resinous material selected from the group consisting of polyvinyl chloride and polypropylene containing from about 0.1 part to about 1.5 parts of an antibacterial agent per 100 parts by weight of said material to protect the material against growth thereon of microorganisms including Gram-negative bacteria, said agent comprising a compound of the formula:

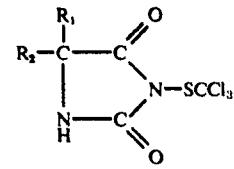

in which both $R_1$ and $R_2$ are hydrogen, methyl, or ethyl and may be the same or different.

2. The combination of claim 1 including a plasticizing amount of a plasticizer.

3. The combination of claim 1 in which said resinous material is polyvinyl chloride.

4. The combination of claim 1 in which said resinous material is polyvinyl chloride and it contains a plasticizing amount of a plasticizer.

5. The combination of claim 1 in which said resinous material is contained in a paint.

6. The combination of claim 1 in which said resinous material is contained in a water-based latex paint.

7. The combination of claim 1 in which said compound is N-trichloromethylthio-5,5-dimethyl hydantoin.

8. The combination of claim 1 in which said resinous material contains in contact therewith the Gram-negative bacterium, Pseudomonas aeruginosa.

9. The combination of claim 1 in which said resinous material contains in contact therewith the Gram-negative bacterium, Escherichia coli.

* * * * *